US012736404B2

(12) United States Patent
Yao et al.

(10) Patent No.: US 12,736,404 B2
(45) Date of Patent: Sep. 15, 2026

(54) POLARIZATION INTELLIGENT SENSING SYSTEM AND POLARIZATION INTELLIGENT SENSING METHOD

(71) Applicant: Changchun Institute Of Optics, Fine Mechanics And Physics, Chinese Academy Of Sciences, Changchun (CN)

(72) Inventors: Dong Yao, Changchun (CN); Hangang Liang, Changchun (CN); Chunming Jiang, Changchun (CN)

(73) Assignee: CHANGCHUN INSTITUTE OF OPTICS, FINE MECHANICS AND PHYSICS, CHINESE ACADEMY OF SCIENCES, Changchun (CN)

(*) Notice: Subject to any disclaimer, the term of this patent is extended or adjusted under 35 U.S.C. 154(b) by 175 days.

(21) Appl. No.: 18/749,966

(22) Filed: Jun. 21, 2024

(65) Prior Publication Data

US 2024/0337535 A1 Oct. 10, 2024

Related U.S. Application Data

(63) Continuation of application No. PCT/CN2023/099545, filed on Jun. 9, 2023.

(30) Foreign Application Priority Data

Jul. 14, 2022 (CN) ......................... 202210825609.7

(51) Int. Cl.
*G01J 3/447* (2006.01)
*G01J 3/28* (2006.01)
(Continued)

(52) U.S. Cl.
CPC ............ *G01J 3/447* (2013.01); *G01J 3/2823* (2013.01); *G06T 5/70* (2024.01); *G06V 10/764* (2022.01); *G06V 10/82* (2022.01); *G06V 20/10* (2022.01)

(58) Field of Classification Search
CPC . G01J 3/447; G01J 3/2823; G01J 4/04; G06T 5/70; G06T 7/0002; G06T 7/70;
(Continued)

(56) References Cited

U.S. PATENT DOCUMENTS 11,200,691 B2 * 12/2021 Javidi ...................... G06T 7/97
12,198,473 B2 * 1/2025 Barton .................... G06N 3/08
(Continued)

FOREIGN PATENT DOCUMENTS

CN 103500444 A 1/2014
CN 104978724 A 10/2015
(Continued)

OTHER PUBLICATIONS

International Search Report issued in corresponding International application No. PCT/CN2023/099545, mailed Aug. 22, 2023.
(Continued)

*Primary Examiner* — Michael A Lyons
*Assistant Examiner* — Maher Yazback
(74) *Attorney, Agent, or Firm* — ITOWARD M. COLIN and Associates, LLC

(57) ABSTRACT

A polarization intelligent sensing system and a polarization intelligent sensing method are provided. The polarization intelligent sensing method includes performing the polarization imaging on the target scene to obtain the polarization image, performing the calculation on the polarization image to obtain the polarization information of the target scene, generating the image information to be restored of the target scene according to the polarization information of the target
(Continued)

scene, and constructing the multi-dimensional target detection neural network based on the DETR, and obtaining the interpretation information of the target scene based on the image information to be restored of the target scene, the spectral information, or the intensity information through the neural networks. The system and the method are widely applied to environments of various carrying platforms, has strong environmental adaptability, and is capable of obtaining target scene information that cannot be sensed by a conventional optical sensor.

7 Claims, 5 Drawing Sheets

(51) Int. Cl.
*G06T 5/70* (2024.01)
*G06V 10/764* (2022.01)
*G06V 10/82* (2022.01)
*G06V 20/10* (2022.01)

(58) Field of Classification Search
CPC ...... G06V 10/764; G06V 10/82; G06V 20/10; G06V 10/14; G06V 10/806; G06N 3/08
See application file for complete search history.

(56) References Cited

U.S. PATENT DOCUMENTS

2016/0273963 A1* 9/2016 Herrick ................ G01J 3/0224
2017/0243079 A1* 8/2017 Hiriyannaiah ....... G02B 27/281
2018/0052333 A1 2/2018 Hiriyannaiah
2022/0215266 A1* 7/2022 Venkataraman ....... G06N 3/045
2023/0316571 A1* 10/2023 Kadambi .................. G06T 7/80
382/188
2025/0289822 A1* 9/2025 Fung .................... C07D 471/18

FOREIGN PATENT DOCUMENTS

CN 110570364 A * 12/2019 ............... G06N 3/08
CN 111861914 A 10/2020
CN 112070698 A 12/2020
CN 114067188 A 2/2022
CN 114693577 A * 7/2022 ............. G06N 3/045
CN 115147506 A * 10/2022 ............. G06T 11/00
CN 115219026 A 10/2022
CN 115561916 A * 1/2023 ........... G02B 27/286

OTHER PUBLICATIONS

Written Opinion of the International Search Authority in corresponding International application No. PCT/CN2023/099545, mailed Aug. 22, 2023.

Yiliang Wan, "Non-official translation: Research on Infrared Distributed Aperture Polarization Imaging Technology", Master's Theses of University of Chinese Academy of Sciences (Changchun Institute of Optics, Fine Mechanics and Physics, Chinese Academy ofSciences), mailed Jun. 1, 2019, entire document.

Yu Liu et al, "Multi-focus image fusion: A Survey of the state of the art", Information Fusion, vol. 64, mailed Jul. 1, 2020, pp. 71-91.

* cited by examiner

POLARIZATION INTELLIGENT SENSING SYSTEM AND POLARIZATION INTELLIGENT SENSING METHOD

CROSS-REFERENCE TO RELATED APPLICATIONS

This application is a continuation of an international application No. PCT/CN2023/099545 filed on Jun. 9, 2023. This international application claims priority to Chinese Patent Application No. 202210825609.7, filed on Jul. 14, 2022 and entitled "POLARIZATION INTELLIGENT SENSING SYSTEM AND POLARIZATION INTELLIGENT SENSING METHOD". The entire contents of the two are incorporated herein by reference.

TECHNICAL FIELD

The present disclosure relates to a technical field of polarization imaging, and in particular to a polarization intelligent sensing system and a polarization intelligent sensing method.

BACKGROUND

As people deeply explore in nature, optical imaging in a severe environment is more and more important, which requires optical devices to have better environmental adaptability. For example, ocean and surroundings occupy about 70% of a surface area of the Earth, but people know less about these; currently, countries in the world all develop research on ocean resources, and effectively obtaining information in a marine environment is a basis for further scientific research and practical application; meanwhile, obtaining a clearer target scene illumination image in a dim light is beneficial for accurately recognizing targets by machine vision.

In China, scattering characteristics of offshore waters are very complex, for example, environment is complex and changeable, water content in the air is large, artificial targets are rare, target images are single, and surroundings, such as sea ice and sea wave, have a significant impact. A light intensity imaging technology is generally affected by environmental factors, changing illumination conditions, such as strong light, weak light, and shadow may cause interference to imaging. When the ocean meets the weak light, there requires higher environmental adaptability of optical imaging devices, therefore, optical observation devices are required to have better environmental adaptability.

One of basic dimensions of polarized light is an imaging technology depending on polarization information of target scenes, which is called polarization imaging technology, is a unique imaging technology, and is relatively good in environmental adaptability. Since lights in different polarization directions have different penetration capabilities on water vapor, defogging may be implemented using the polarization information; polarization interpretation information has an enhancement effect on low-contrast data, which applies to obtain image information from a distance in the severe environment and has relative advantage in aspects of background noise suppression, detection distance improvement, detail feature enhancement, target camouflage recognition, etc. Meanwhile, the polarization imaging technology is capable of suppressing sunlight and highlighting the artificial targets, such advantages lay a foundation for the polarization imaging technology to widely use in the severe environment, such as the marine environment, so that the polarization imaging technology has better environmental adaptability.

Moreover, in order to obtain better restored images of the target scenes, the present disclosure proposes a polarization image enhancement model, which comprehensively calculates and processes using intensity images, polarization degree images, and polarization phase angle image to obtain fused polarization images having better target highlighting effects to be one of basic input data of a neural network.

Nowadays, information processing capability of the people is limited, which cannot keep pace with processing of massive information, however, artificial intelligence may better overcome such innate shortcomings of the people and solve this problem to achieve rapid image interpretation. Currently, there can be hardly seen optical devices having severe environment capability appearing in the market, ocean remote sensing is generally based on high penetrability of infrared optical spectrum to the water vapor. Different form above technologies, the present disclosure proposes to combine the polarization imaging technology with artificial intelligence technology to provide a system having better environmental adaptability.

SUMMARY

For overcoming technical defects in the prior art, the present disclosure aims to provide a polarization intelligent sensing system and a polarization intelligent sensing method, which combines a polarization imaging technology with an artificial intelligence technology to perform information search and processing using a calculation speed being similar to real time, is suitable for various application scenarios, such as sea area trend perception, sea area target search, and sea ice detection, and is particularly suitable for severe environment, such as a marine environment, a poor illumination environment, and a water mist environment, etc.

In order to achieve above aims, the present disclosure adopts following technical solutions.

The present disclosure provides the polarization intelligent sensing system, including a polarization optical imaging module, a polarization image processing module, a target scene image enhancement module, and a target scene interpretation module. The polarization optical imaging module is configured to perform polarization imaging on a target scene to obtain a polarization image, the polarization image processing module is configured to perform calculation on the polarization image to obtain polarization information of the target scene, the target scene image enhancement module is configured to generate image information to be restored of the target scene according to the polarization information of the target scene, and the target scene interpretation module is configured to obtain interpretation information of the target scene based on the image information to be restored of the target scene, spectral information, or intensity information through neural networks.

Furthermore, the polarization image processing module includes a polarization image preprocessing unit and a polarization information calculation unit. The polarization image preprocessing unit is configured to preprocess the polarization image to obtain a preprocessed polarization image, and the polarization information calculation unit is configured to perform calculation on the preprocessed polarization image to obtain polarization degree information and polarization phase angle information of pixels.

Furthermore, the target scene image enhancement module adopts a multi-dimensional target detection neural network based on Detection Transformer (DT), the multi-dimensional target detection neural network includes a pre-processing sub-module, a transformer sub-module, and a prediction output sub-module. The pre-processing sub-module is configured to take a combination of an intensity image, a polarization degree, a polarization phase angle, a restored target scene image, and the spectral information as an input or a partial combination of the intensity image, the polarization degree, the polarization phase angle, the restored target scene image, the spectral information as the input and perform noise reduction and feature fusion on the polarization image in combination with a noise reduction module and a convolutional neural network (CNN). The transformer sub-module is configured to extract related data of a target object through a Transformer model; and the prediction output sub-module is configured to process data output by the transformer sub-module through a feedforward neural network (FNN) to obtain a multi-target detection result.

Furthermore, the target scene image enhancement module adopts a polarization image enhancement model IMG(O) $=k_1*C1\{I_0, I_{45}, I_{90}, I_{135}\}+k_2*C2\{IMG(D)\}+k_3*C3\{IMG(A)\}$. The IMG(O) denotes the image information to be restored of the target scene, the $C1\{I_0, I_{45}, I_{90}, I_{135}\}$ denotes a preferred image calculated according to a first polarization image, a second polarization image, a third polarization image, and a fourth polarization image respectively having a linear polarization angle of 0°, 45°, 90°, 135°, the preferred image is a single polarization angle image or a multi-angle calculated image. The IMG(D) denotes a polarization degree image, and the C2{IMG(D)} denotes a first calculation image containing edge highlight information of a target space obtained through the polarization degree image. The IMG(A) denotes a polarization phase angle image, and the C3{IMG(A)} denotes a second calculation image containing surface information of a target object obtained through the polarization phase angle image, The k1, the k2, and the k3 respectively denote an intensity coefficient of a calculation preferred image of the polarization image, an intensity coefficient of a polarization degree calculation image of the polarization image, and an intensity coefficient of a polarization phase angle calculation image of the polarization image.

Furthermore, the polarization optical imaging module includes a polarization optical lens and a polarization detector, and the polarization optical lens and the polarization detector are matched with each other.

The present disclosure further provides the polarization intelligent sensing method, applied to the polarization intelligent sensing system as foregoing, including:

- a step S1: performing the polarization imaging on the target scene to obtain the polarization image;
- a step S2: performing the calculation on the polarization image to obtain the polarization information of the target scene;
- a step S3: generating the image information to be restored of the target scene according to the polarization information of the target scene; and
- a step S4: obtaining the interpretation information of the target scene based on the image information to be restored of the target scene, the spectral information, or the intensity information through the neural networks.

Furthermore, the step S2 includes:

- a step S21: preprocessing the polarization image to obtain a preprocessed polarization image;
- a step S22: obtaining Stokes vectors of the target scene from the preprocessed polarization image; and
- a step S23: calculating to obtain the polarization information of the target scene based on the Stokes vectors.

The polarization information includes polarization degree information and polarization phase angle information.

A calculation formula of the polarization degree information DoP is $$DoP = \frac{\sqrt{Q^2 + U^2 + V^2}}{I},$$

or, a calculation formula of linear polarization degree information DoLP is $$DoLP = \frac{\sqrt{Q^2 + U^2}}{I},$$

where I, the Q, the U, the V respectively denote the Stokers vectors of the target scene. A calculation formula of the polarization phase angle information AoLP is $$AoLP = \frac{-180}{\Pi} \cdot \arctan\left(\frac{U}{Q}\right).$$

Furthermore, in the step 521, defining adjacent four pixels as a super pixel $I=[I_0, I_{45}, I_{90}, I_{135}]$, denoting detection intensity as $I_d$, denoting a real target intensity as $I_r$, calibrating the detection intensity through a polynomial fitting method to perform image denoising on the polarization image, where the polynomial fitting method satisfies a formula of $I_r=a_0+a_1I_d+a_1I_d^2 \ldots a_nI_d^n$, and $a_0 \ldots a_n$ are coefficients of a polynomial.

Furthermore, in the step S3, constructing the multi-dimensional target detection neural network based on the DETR. Specifically, the multi-dimensional target detection neural network includes the preprocessing sub-module, the transformer sub-module, and the prediction output sub-module. The preprocessing sub-module is configured to take the combination of the intensity image, the polarization degree, the polarization phase angle, the restored target scene image, and the spectral information as the input or the partial combination of the intensity image, the polarization degree, the polarization phase angle, the restored target scene image, the spectral information as the input and perform the noise reduction and the feature fusion on the polarization image in combination with the noise reduction module and the CNN. The transformer sub-module is configured to extract related data of the target object through the Transformer model. The prediction output sub-module is configured to process the data output by the transformer sub-module through the FNN to obtain the multi-target detection result.

Furthermore, in the step S3, constructing a polarization image enhancement model $IMG(O)=k_1*C1\{I_0, I_{45}, I_{90}, I_{135}\}+k_2*C2\{IMG(D)\}+k_3*C3\{IMG(A)\}$. Specifically, the IMG(O) denotes the image information to be restored of the target scene, the $C1\{I_0, I_{45}, I_{90}, I_{135}\}$ denotes a preferred image calculated according to a first polarization image, a second polarization image, a third polarization image, and a fourth polarization image respectively having a linear polarization angle of 0°, 45°, 90°, 135°, the preferred image is a single polarization angle image or a multi-angle calculated image. The IMG(D) denotes a polarization degree image, and the C2{IMG(D)} denotes a first calculation image containing edge highlight information of a target space obtained through the polarization degree image. The IMG (A) denotes a polarization phase angle image, and the C3{IMG(A)} denotes a second calculation image containing surface information of a target object obtained through the polarization phase angle image. The $k_1$, the $k_2$, and the $k_3$ respectively denote an intensity coefficient of a calculation preferred image of the polarization image, an intensity coefficient of a polarization degree calculation image of the polarization image, and an intensity coefficient of a polarization phase angle calculation image of the polarization image.

The present disclosure is capable of achieving following technical effects.

First, the present disclosure is widely applied to environments of various carrying platforms, has strong environmental adaptability, and is capable of obtaining target scene information that cannot be sensed by a conventional optical sensor, such as the polarization degree information, the polarization phase angle information, image enhancement information, etc. Obtaining a new information dimension lays a technical foundation wide application of the polarization intelligent sensing system, the present disclosure is suitable for various application scenarios, such as the sea area trend perception, the sea area target search, and the sea ice detection, and is particularly suitable for the severe environment, such as the marine environment, the poor illumination environment, and the water mist environment, etc.

Second, the present disclosure combines the polarization imaging technology with the artificial intelligence technology to perform the information search and processing using the calculation speed being similar to real time.

Third, high-quality target scene image information is obtained.

Fourth, a target scene image is more accurately interpreted, a typical object in the target scene image is classified, and position information of a target object is obtained.

Figure 1:
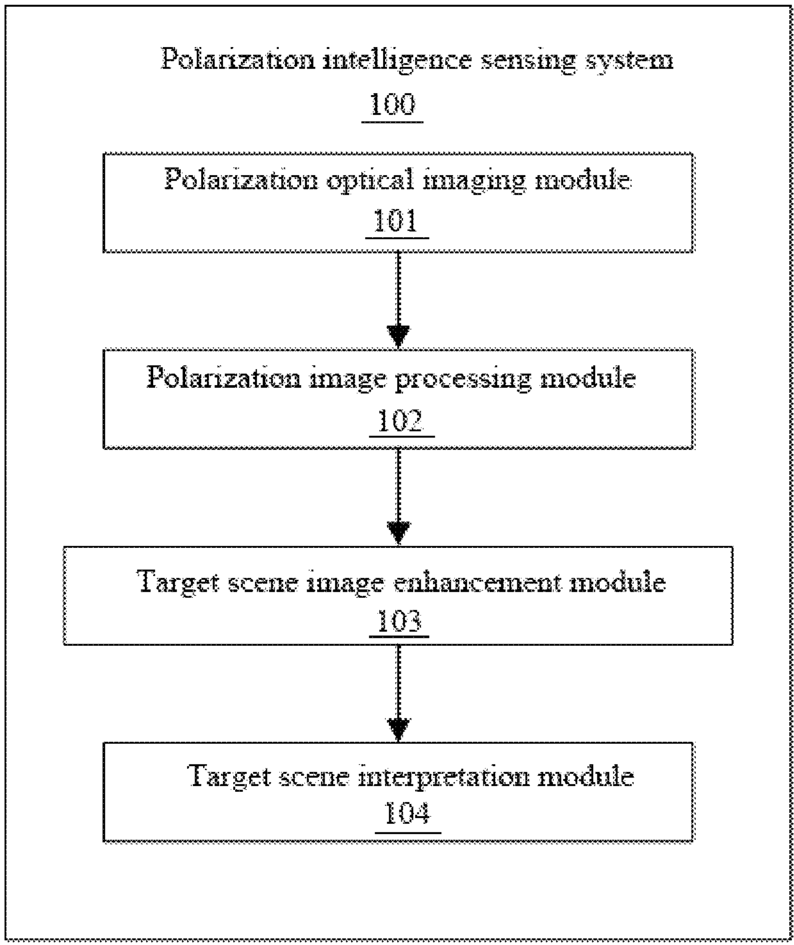
FIG. 1 is a schematic diagram of a logical structure of a polarization intelligent sensing system according to one embodiment of the present disclosure.

Reference numerals in the drawings: 100. polarization intelligence sensing system; 101. polarization optical imaging module; 102. polarization image processing module; 103. target scene image enhancement module; 104. target scene interpretation module.

DETAILED DESCRIPTION

Hereinafter, embodiments of the present disclosure are described with reference to accompanying drawings. In following description, the same modules are denoted by the same reference numerals. In the case of the same reference numerals, their names and functions are also the same. Accordingly, the detailed description thereof will not be repeated.

In order to make objectives, technical solutions, and advantages of the present disclosure clearer, the present disclosure is further described in detail below with reference to the accompanying drawings and specific embodiments. $I_t$ should be understood that the specific embodiments described herein are only used to explain the present disclosure, but do not constitute a limitation to the present disclosure.

FIG. 1 is a schematic diagram of a logical structure of a polarization intelligent sensing system according to one embodiment of the present disclosure.

As shown in FIG. 1, the embodiments of the present disclosure provide a polarization intelligent sensing system 100, including a polarization optical imaging module 101, a polarization image processing module 102, a target scene image enhancement module 103, and a target scene interpretation module 104. The polarization optical imaging module 101 is configured to perform polarization imaging on a target scene to obtain a polarization image, the polarization image processing module 102 is configured to perform calculation on the polarization image to obtain polarization information of the target scene, the target scene image enhancement module 103 is configured to generate image information to be restored of the target scene according to the polarization information of the target scene, and the target scene interpretation module 104 is configured to obtain interpretation information of the target scene based on the image information to be restored of the target scene, spectral information, or intensity information through neural networks.

The polarization optical imaging module 101 includes a polarization optical lens and a polarization detector, the polarization optical lens generally refers to various optical systems that is capable of being imaged, preferably, the polarization optical lens is matched with requirements of the polarization detector, for example, a modulation transfer function (MTF) value of a spatial resolution of the polarization optical lens at a spatial frequency of the polarization detector is better than 0.3. Meanwhile, the polarization optical lens is requested to have polarization aberration suppression capability, so that polarization information of an incident light is well hold, and no extra aberration is introduced. The polarization optical lens includes, but is not limited to, a prime lens, a zoom lens, a refractive lens, a reflective lens, a catadioptric lens, etc. The polarization detector refers to detectors that sense polarization characteristics of the target scene, the detectors may be divided into four categories including devision of focal plane, devision of time, devision of aperture, and devision of amplitude, and a specific selection needs to be adapted to a structure of an optical lens.

Figure 2:
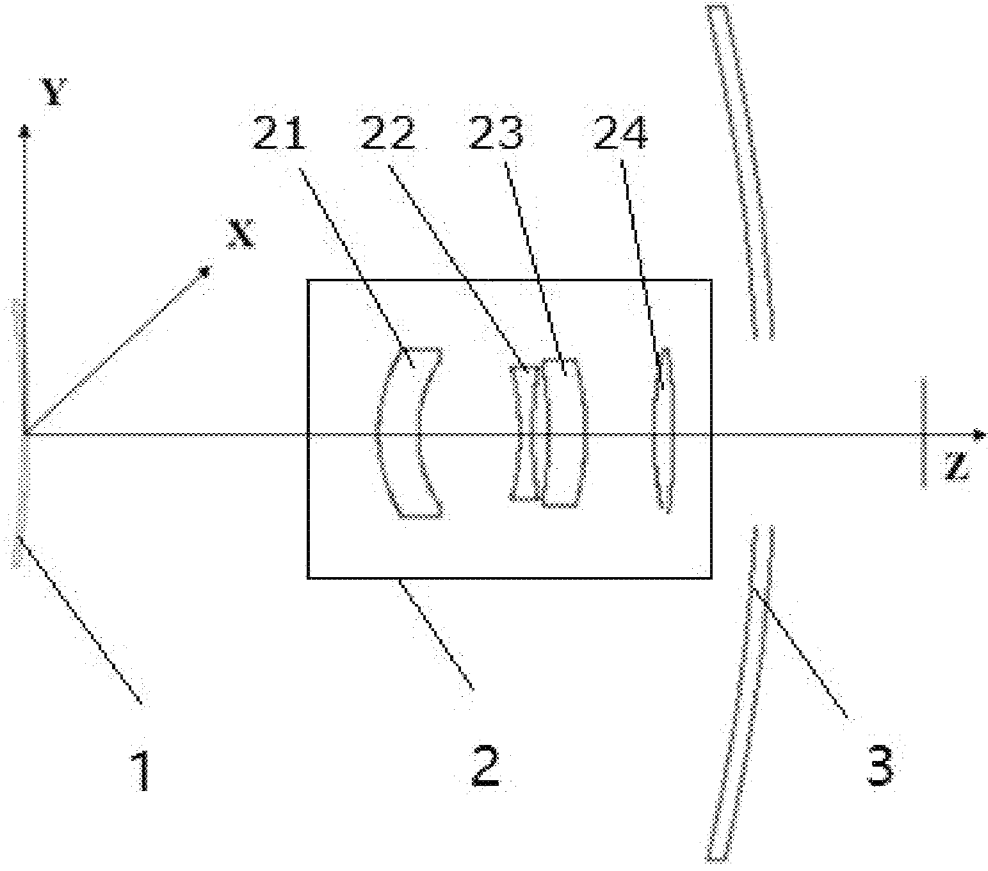
FIG. 2 is a structural schematic diagram of a Cassegrain catadioptric polarization optical system according to one embodiment of the present disclosure.

According to different polarization implementation mechanisms, there may be different polarization optical lens structures, a catadioptric polarization lens is mainly described herein, as a Cassegrain catadioptric polarization optical system shown in FIG. 2, a transmission polarization compensation lens group 2 is located between a primary lens 3 and a secondary lens 1, the transmission polarization compensation lens group 3 comprises a first lens 21, a second lens 22, a third lens 23, and a fourth lens 24 sequentially arranged from the secondary lens 1 to the primary lens 3, a front surface, facing the secondary lens 1, of the first lens 21 is a concave surface, a front surface and a rear surface of the second lens 22 are both concave surfaces, a front surface of the third lens 23 is a concave surface, a rear surface of the third lens 23 is a convex surface, and a front surface and a rear surface of the fourth lens 24 are both convex surfaces.

In the Cassegrain catadioptric polarization optical system, a reflection mode and a refraction mode are combined, so that correction of the polarization aberration is realized, and at the same time, a requirement of the spatial resolution of the Cassegrain catadioptric polarization optical system is met, the Cassegrain catadioptric polarization optical system is adapted to an image splitting plane polarization detector. In such a design process of the polarization lens, a polarization aberration distribution at a surface of the image splitting plane polarization detector should be calculated in detail to obtain an initial polarization aberration distribution characteristic of an image.

Figure 3:
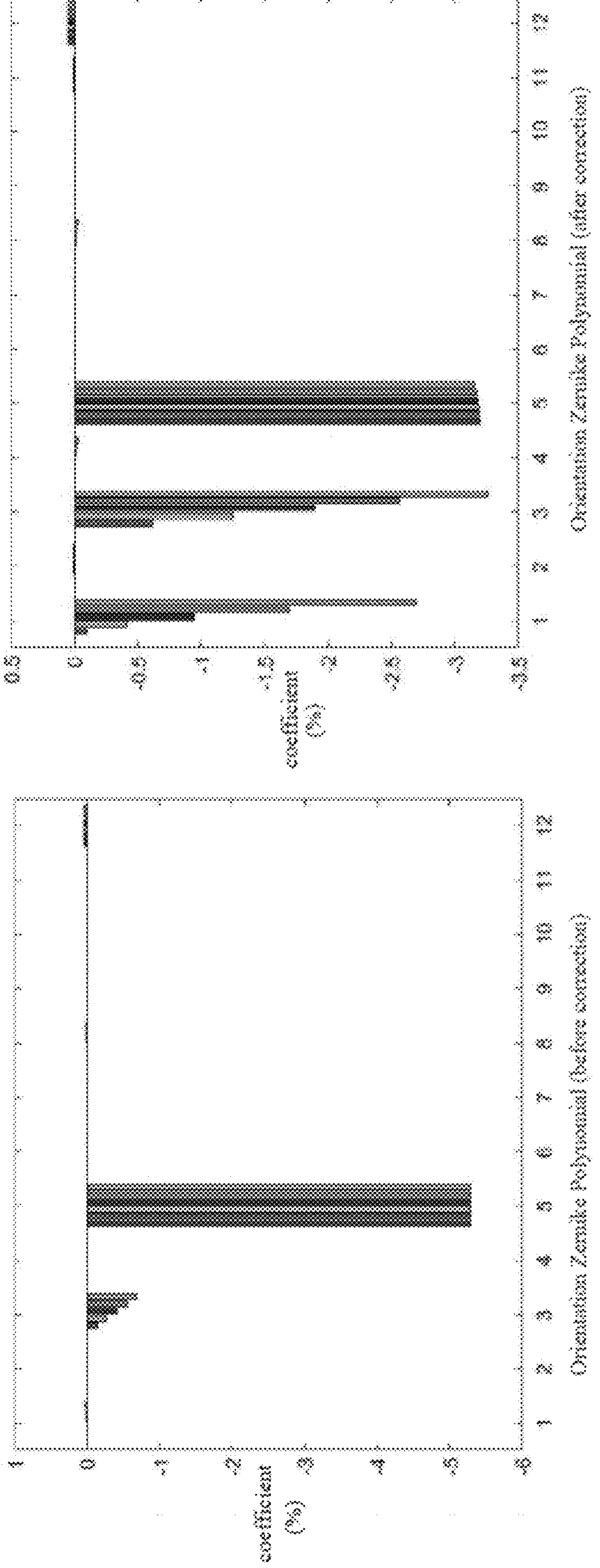
FIG. 3 is a schematic diagram of comparison before and after optimization of polarization aberration according to one embodiment of the present disclosure.
Figure 3:

A conventional lens may generate a strong polarization aberration, which has a strong influence on a polarization characteristic of the incident light, and therefore, for a polarization remote sensing lens, a polarization aberration optimization design needs to be carried out. Conventional lenses that do not perform polarization aberration optimization generally have a large polarization aberration, as shown in the left image in FIG. 3; the polarization aberration optimization is implemented in a manner of combining a transmission element and a reflection element, as shown in the right image in FIG. 3.

The polarization image processing module 102 includes a polarization image preprocessing unit and a polarization information calculation unit. The polarization image preprocessing unit is configured to preprocess the polarization image, such as gray value stretching, denoising, sharpening, and other operations, to obtain a preprocessed polarization image, so as to better carry out subsequent work, and the polarization information calculation unit is configured to perform calculation on the preprocessed polarization image to obtain polarization degree information and polarization phase angle information of pixels.

After obtaining a polarization original image, the polarization information, including but not limited to the polarization information, the polarization phase angle information, and the intensity information, needs to be calculated according to requirements. Taking a focus-splitting plane detector as an example, the polarization original image includes intensity information of different angles, such as $I_0$, $I_{45}$, $I_{90}$, $I_{135}$, and Stokes vectors are calculated by using following formula according to above information:

$$S = \begin{bmatrix} I \\ Q \\ U \\ V \end{bmatrix} = \begin{bmatrix} I_0 + I_{90} \\ I_0 - I_{90} \\ I_{45} - I_{135} \\ I_L - I_R \end{bmatrix}.$$

Polarization degree information and polarization phase angle information pixel-by-pixel are solved according to the calculated Stokes vectors.

$$DoP = \frac{\sqrt{Q^2 + U^2 + V^2}}{I},$$

an image consisting of the polarization degree information is referred to as a polarization degree image IMG (D).

$$AoLP = \frac{180}{\prod} \cdot \arctan\left(\frac{U}{Q}\right),$$

an image consisting of the polarization phase angle information is referred to as a polarization phase angle image IMG (A).

The target scene image enhancement module 103 performs work, such as image enhancement and fusion in combination with use requirements, constructs a neuron network model in combination with characteristics of input data, achieves quasi-real-time processing of an input image, generates information concerned by customers, and transmits the information to the next node. For example, through sample training, intelligent recognition and perception may be performed on targets, such as marine vessels, sea ice, shallow reefs, islands, and personnel.

The target scene image enhancement module 103 adopts a polarization image enhancement model IMG(O)= $k_1$*C1{$I_0$, $I_{45}$, $I_{90}$, $I_{135}$}+$k_2$*C2{IMG(D)}+$k_3$*C3{IMG (A)}.

The IMG(O) denotes the image information to be restored of the target scene, the C1{$I_0$, $I_{45}$, $I_{90}$, $I_{135}$} denotes a preferred image calculated according to a first polarization image, a second polarization image, a third polarization image, and a fourth polarization image respectively having a linear polarization angle of 0°, 45°, 90°, 135°, the preferred image is a single polarization angle image or a multi-angle calculated image, a calculation process thereof includes, but is not limited to, a weighted average, filtering, noise reduction, and other processes in a conventional algorithm. The IMG(D) denotes a polarization degree image, and the C2{IMG(D)} denotes a first calculation image containing edge highlight information of a target space obtained through the polarization degree image. The IMG(A) denotes a polarization phase angle image, and the C3{IMG(A)} denotes a second calculation image containing surface information of a target object obtained through the polarization phase angle image, The k1, the k2, and the k3 respectively denote a weight coefficient of a calculation preferred image of the polarization image, a weight coefficient of a polarization degree calculation image of the polarization image, and a weight coefficient of a polarization phase angle calculation image of the polarization image.

In one embodiment, the target scene image enhancement module 103 adopts a multi-dimensional target detection neural network based on Detection Transformer (DT), the multi-dimensional target detection neural network includes a pre-processing sub-module, a transformer sub-module, and a prediction output sub-module. The pre-processing sub-module is configured to take a combination of an intensity image, a polarization degree, a polarization phase angle, a restored target scene image, and the spectral information as an input or a partial combination of the intensity image, the polarization degree, the polarization phase angle, the restored target scene image, the spectral information as the input and perform noise reduction and feature fusion on the polarization image in combination with a noise reduction module and a convolutional neural network (CNN). The transformer sub-module is configured to r1 extract related data of a target object through a Transformer model. and the prediction output sub-module is configured to process data output by the transformer sub-module through a feedforward neural network (FNN) to obtain a multi-target detection result.

The foregoing describes in detail a logical structure of the polarization intelligent sensing system according to one embodiment of the present disclosure. Corresponding to the polarization intelligent sensing system, one embodiment of the present disclosure further provides a polarization intelligent sensing method applied to the polarization intelligent sensing system.

Figure 4:
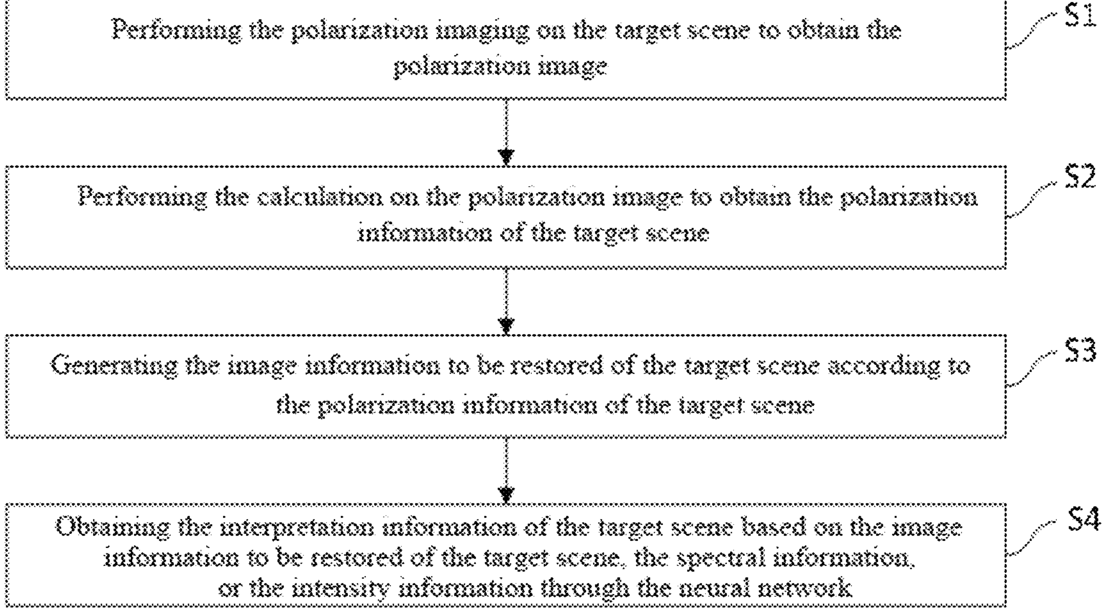
FIG. 4 is a schematic flowchart of a polarization intelligent sensing method according to one embodiment of the present disclosure.

FIG. 4 is a schematic flowchart of the polarization intelligent sensing method according to one embodiment of the present disclosure.

As shown in FIG. 4, the present disclosure provides the polarization intelligent sensing method including following steps.

A step S1: performing the polarization imaging on the target scene to obtain the polarization image.

A step S2: performing the calculation on the polarization image to obtain the polarization information of the target scene.

The step S2 specifically includes following sub-steps.

A step S21: preprocessing the polarization image to obtain a preprocessed polarization image.

The process mainly achieves calibration of detection intensity of a sensor, taking a conventional four-linear polarization direction detector as an example (may be expanded into a full polarization detector in the future), adjacent four pixels are defined as a super pixel $I=[I_0, I_{45}, I_{90}, I_{135}]$, detection intensity is denoted as $I_d$, a real target intensity is denoted as $I_t$, a core purpose of a denoising process is to obtain the real target intensity $I_t$ through the detection intensity $I_d$. In the present disclosure, a polynomial fitting method is adopted to calibrate the detection intensity. Components of noise include, but are not limited to, cross-talk in a polarization extinction direction, and noise of the conventional four-linear polarization direction detector itself, such as dark current noise, shot noise, flicker noise, thermal noise, etc., and a calibration process may be expressed as the following formula:

$$I_t = a_0 + a_1 I_d + a_1 I_d^2 \ldots a_n I_d^n.$$

Specifically, $a_0 \ldots a_n$ are coefficients of a polynomial, which may be performed through a laboratory and an external field test, and a mathematical method may be a least square method, a multivariate linear regression method, etc.

A step S22: obtaining Stokes vectors (I, Q, U, V) of the target scene from the preprocessed polarization image.

A step S23: calculating to obtain the polarization information of the target scene based on the Stokes vectors.

The polarization information includes polarization degree information and polarization phase angle information.

A calculation formula of the polarization degree information DoP is $$DoP = \frac{\sqrt{Q^2 + U^2 + V^2}}{I},$$

or, a calculation formula of linear polarization degree information $$DoLP = \frac{\sqrt{Q^2 + U^2}}{I},$$

where I, the Q, the U, the V respectively denote the Stokers vectors of the target scene. A calculation formula of the polarization phase angle information AoLP is $$AoLP = \frac{-180}{\Pi} \cdot \arctan\left(\frac{U}{Q}\right).$$

For a focus-splitting plane polarization detection system, since the focus-splitting plane polarization detection system senses linear polarization information (I, Q, U), circular polarization information cannot be sensed. Therefore, the calculation formula of the linear polarization degree information DoLP is $$DoLP = \frac{\sqrt{Q^2 + U^2}}{I},$$

and the calculation formula of the polarization phase angle information AoLP is $$AoLP = \frac{-180}{\Pi} \cdot \arctan\left(\frac{U}{Q}\right).$$

According to different target scenes, different polarization information is adaptively calculated, for example, for an edge feature obvious type target, polarization degree information thereof is mainly extracted, and for an opposite feature obvious type target, polarization phase angle information thereof is mainly extracted. Weights of the two in an intelligent recognition algorithm are intelligently selected herein. After an intelligent driving solution, weight ratios allocated to a polarization degree image and a polarization phase angle image are respectively K1 and K2.

A step S3: generating the image information to be restored of the target scene according to the polarization information of the target scene.

In combination with a polarization feature of a target, artificial intelligence recognition may be carried out by using the neural network, and compared with a conventional intensity image, the polarization intelligent sensing method has a significant advantage. A conventional artificial intelligence processing technology is mainly based on an intensity image, and has a mature artificial intelligence framework, such as a YOLO series, but this system mainly uses the intensity image. The polarization information is an independent information dimension of the target scene, and an artificial intelligence processing framework adapted to a target polarization image does not appear on the market, so a manner of combining a polarization camera with artificial intelligence proposed in the present disclosure is innovative. In practical aspects, the present disclosure has a very wide application prospect, such artificial target search on sea surfaces, detection and identification of the sea surfaces and underwater targets, navigation, satellite-borne or airborne remote sensing in smoke climate environment conditions, etc. Moreover, the present disclosure may also be combined with other technologies, such as a conventional intensity image information acquisition technology, a spectrum acquisition technology, a radar technology, etc.

In an aspect of artificial intelligence recognition, the present disclosure performs work, such as image enhancement and fusion in combination with the use requirements, constructs the neuron network model in combination with the characteristics of the input data, achieves the quasi-real-time processing of the input image, generates the information concerned by the customers, and transmits the information to the next node. For example, through the sample training, the intelligent recognition and perception may be performed on the targets, such as the marine vessels, the sea ice, the shallow reefs, the islands, and the personnel.

The neuron network model includes but is not limited to following two types, and both may be configured to restore an image closer to real information of the target scene.

First, the polarization image enhancement model IMG (O)= $k_1$*C1{$I_0$, $I_{45}$, $I_{90}$, $I_{135}$}+$k_2$*C2{IMG(D)}+ $k_3$*C3{IMG(A)} is constructed. Specifically, the IMG(O) denotes the image information to be restored of the target scene, the C1{$I_0$, $I_{45}$, $I_{90}$, $I_{135}$} denotes a preferred image calculated according to a first polarization image, a second polarization image, a third polarization image, and a fourth polarization image respectively having a linear polarization angle of 0°, 45°, 90°, 135°, the preferred image is a single polarization angle image or a multi-angle calculated image. The IMG(D) denotes a polarization degree image, and the C2{IMG(D)} denotes a first calculation image containing edge highlight information of a target space obtained through the polarization degree image. The IMG(A) denotes a polarization phase angle image, and the C3{IMG(A)} denotes a second calculation image containing surface information of a target object obtained through the polarization phase angle image, The k1, the k2, and the k3 respectively denote an intensity coefficient of a calculation preferred image of the polarization image, an intensity coefficient of a polarization degree calculation image of the polarization image, and an intensity coefficient of a polarization phase angle calculation image of the polarization image.

Second, the CNN is constructed, the CNN takes polarization images including a polarization degree image A, a polarization phase angle image B, polarization images of various polarization angles as an input, takes a corresponding person as an optimized IMG(O) as a label, and performs training around a typical target scene to finally obtain a network structure capable of intelligently outputting an ideal IMG (O).

Figure 5:
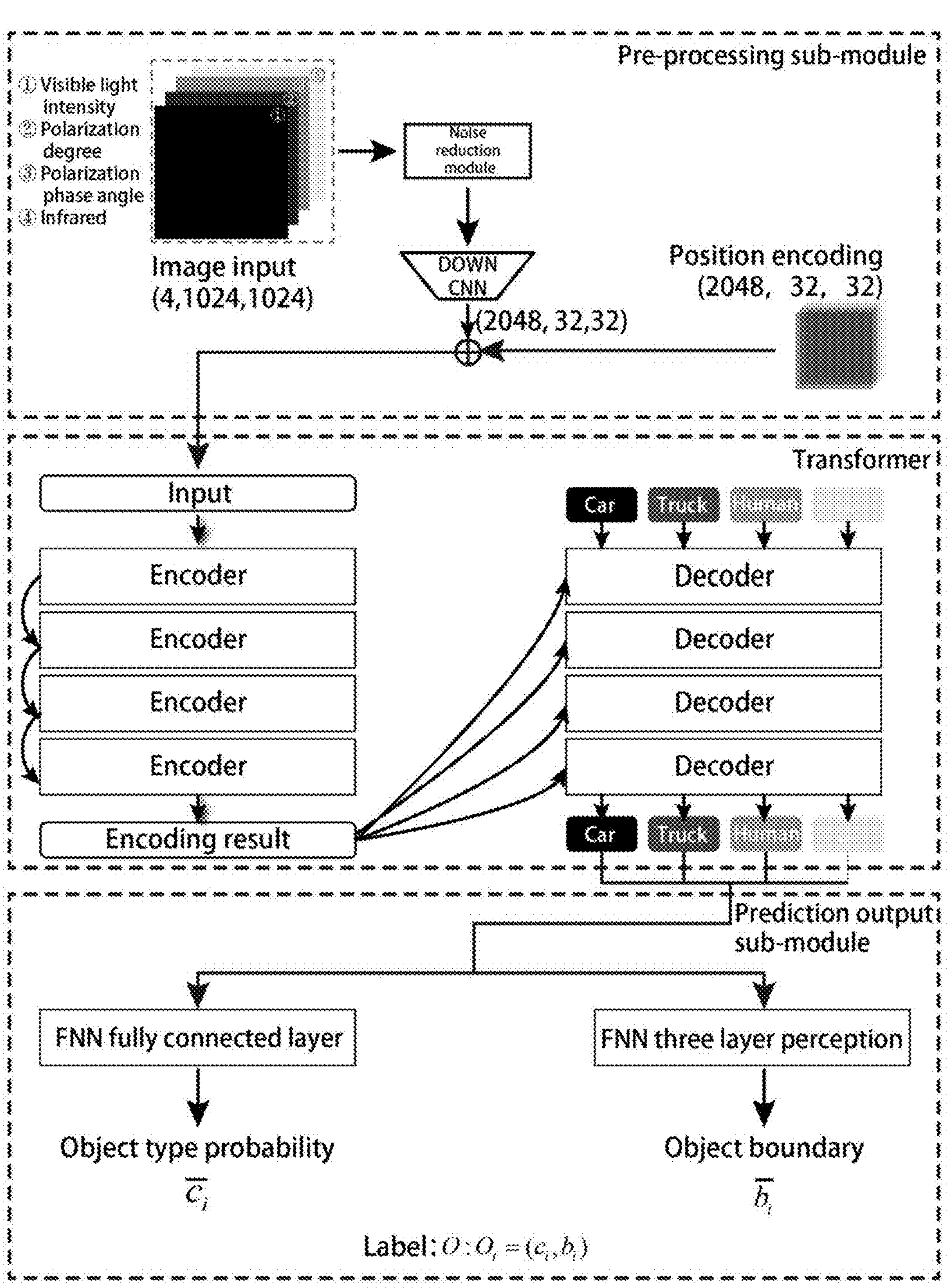
FIG. 5 is a schematic diagram of a logical structure of a multi-dimensional target detection neural network based on Detection Transformer (DT) according to one embodiment of the present disclosure.

In order to optimize a target detection task by using an advantage of the polarization camera compared with a common visible light camera that being capable of obtaining different target related information, a multi-dimensional target detection neural network based on the DETR network is provided, as shown in FIG. 5, the multi-dimensional target detection neural network includes the pre-processing sub-module, the transformer sub-module, and the prediction output sub-module. The pre-processing sub-module is configured to take the combination of the intensity image, the polarization degree, the polarization phase angle, the restored target scene image, and the spectral information as the input or the partial combination of the intensity image, the polarization degree, the polarization phase angle, the restored target scene image, the spectral information as the input and perform the noise reduction and the feature fusion on the polarization image in combination with the noise reduction module and the CNN. The transformer sub-module is configured to extract the elated data of the target object through a Transformer model, and the prediction output sub-module is configured to process the data output by the transformer sub-module through the FNN to obtain a multi-target detection result.

As shown in FIG. 5, images of four different dimensions including visible light intensity, polarization degree, polarization phase angle, and infrared at the same viewing angle are combined together as a four-channel image and input into a specially trained DETR network. In this network, noise reduction preprocessing is first performed on the four-channel image, and then image features in each channel are fused by using DOWN-CNN, composed of a convolutional layer and a pooling layer, so as to reduce resolution is to further reduce subsequent memory requirements. Then, related features of each object are extracted through four transform blocks, and finally, object types and a position of a corresponding type included in the four channel image are obtained through two FNNs, a training label thereof is generated by an image labeling tool labelImg, a training task thereof is a bipartite graph matching problem between a prediction result and the training label thereof, a minimum loss is optimized and solved through a Hungarian algorithm, and a trained network is obtained. A loss function is defined as follows: a prediction result is considered as a sequence $\overline{O_i}=(\overline{c_l}, \overline{b_l})$ with a fixed length N, a label is represented as O:$O_i$=($c_i$, $b_i$), where i∈(1, N), the $c_i$ represents the object types, the $b_i$ is border quadruple, and a minimum matching strategy defined by the Hungarian algorithm is as follows:

$$\hat{\rho} = \underset{\sigma \in S_N}{\arg\min} \sum_i^N \mathcal{L}_{match}(O_i, \bar{O}_{\sigma(i)}). \tag{1}$$

Specifically, the $S_N$ represents an arrangement of elements with smallest costs having the number of n, the $\mathcal{L}_{match}$ simultaneously considers a similarity prediction between a category and a ground truth box, a category prediction confidence of the $c_i$ is $\overline{P}_\sigma$(i)($c_i$), a bounding box is predicted to be $\overline{b}_\sigma$(i), and the $\mathcal{L}_{match}$ is expressed as follows:

$$\mathcal{L}_{match}(Q_i, \bar{Q}_{\sigma(i)}) = -1_{\{c_i \neq \phi\}} \overline{P}_{\sigma(i)}(c_i) + 1_{\{c_i \neq \phi\}} \mathcal{L}_{box}(b_i, \bar{b}_{\sigma(i)}). \tag{2}$$

$\mathcal{L}_{box}$ is obtained by linearly combining L1 loss and iou loss, which is expressed as follows:

$$\mathcal{L}_{box}(b_i, \bar{b}_{\sigma(i)}) = \lambda_{iou} \mathcal{L}_{iou}(b_i, \bar{b}_{\sigma(i)}) + \lambda_{L1} \| b_i - \bar{b}_{\sigma(i)} \|_1. \tag{3}$$

The $\lambda_{iou}$ and the $\mathcal{L}_{iou}$ are set hyperparameters, and an overall loss $\mathcal{L}_{Hungarian}$ is expressed as follows:

$$\mathcal{L}_{Hungarian}(O, \overline{O}) = \sum_{i=1}^N \left[ -1_{\{c_i \neq \phi\}} \log \overline{P}_{\sigma(i)}(c_i) + 1_{\{c_i \neq \phi\}} \mathcal{L}_{box}(b_i, \bar{b}_{\sigma(i)}) \right]. \tag{4}$$

A training goal thereof is to minimize the overall loss.

Based on a significant difference characteristic between the polarization image and a conventional image, the polarization image is very sensitive to incident light of strong polarization information, so that weak light is brighten and bright light is weaken. The above-mentioned scenes, such as the marine vessels, the sea ice, the shallow reefs, the islands, and the personnel all have significant polarization characteristics with a background, so that a significant difference is presented on the polarization image, which is different from a conventional intensity image and is also a starting point of the present disclosure.

In a specific implementation, there are a plurality of flexible technical solutions, for example, a polarization degree image is used alone to identify a contour of an artificial structure, such as buildings, in a target scene, identify a smooth surface, such as a glass, and identify a moving artificial object, such as a vehicle; for another example, dark scene enhancement, such as removal of shadows, is implemented in a manner of fusing the polarization degree image and the polarization phase angle image; and for another example, an inclination angle of the target object is estimated by using the polarization degree image.

The polarization image is used as a sample set for artificial intelligence recognition, and compared with the conventional intensity image, a target having a polarization characteristic is better recognized.

A step S4: obtaining the interpretation information of the target scene based on the image information to be restored of the target scene, the spectral information, or the intensity information through the neural networks.

The present disclosure not only obtains interpretation of the target scene through taking the image information to be restored of the target scene generated by the polarization information as an input of the neural networks, but also obtains the interpretation information of the target scene through taking the spectral information or the intensity information as the input of the neural networks, and comprehensive calculation data is stored.

Reference throughout the specification to "one embodiment", "some embodiments", "an example", "a specific example" or "some examples" refers to a particular feature, structure, material, or characteristic described in connection with the embodiment or feature included in at least one embodiment or example of the present disclosure. In this specification, schematic representations of above terms do not necessarily refer to the same embodiment or example. Furthermore, the particular features, structures, materials, or characteristics may be combined in any suitable manner in any one or more embodiments or examples. In addition, different embodiments or examples described in the specification and features of different embodiments or examples may be combined by those who skilled in the art without contradicting each other.

Although the embodiments of the present disclosure have been shown and described above, it can be understood that the above embodiments are exemplary and should not be construed as limiting the present disclosure, those who skilled in the art may change, modify, replace, and change the foregoing embodiments within a protection scope of the present disclosure.

The above specific embodiments of the present disclosure do not constitute a limitation on the protection scope of the present disclosure. Any other corresponding changes and modifications made according to the technical concept of the present disclosure shall fall within a protection scope of the claims of the present disclosure.

What is claimed is:

1. A polarization intelligent sensing system, comprising:

a polarization optical imaging module, consisting of a polarization optical lens and a polarization detector, configured to perform polarization imaging on a target scene to obtain a polarization image;

a processor; and a memory storing a polarization image processing module, a target scene image enhancement module, and a target scene interpretation module that are programs;

wherein when the polarization image processing module, the target scene image enhancement module, and the target scene interpretation module are executed by the processor, the polarization intelligent sensing system is caused to:

perform calculation on the polarization image by the polarization image processing module to obtain polarization information of the target scene;

generate image information to be restored of the target scene by the target scene image enhancement according to the polarization information of the target scene; and obtain and output interpretation information including a multi-target detection result of the target scene, by the target scene interpretation module, based on the image information to be restored of the target scene, spectral information, or intensity information through neural networks;

wherein the polarization optical lens has a weak polarization modulation characteristic;

wherein the target scene image enhancement module adopts a multi-dimensional target detection neural network based on Detection Transformer (DT), the multi-dimensional target detection neural network comprises a pre-processing sub-module, a transformer sub-module, and a prediction output sub-module; the pre-processing sub-module is a feedforward neural network (FNN) configured to take a combination of an intensity image, a polarization degree, a polarization phase angle, a restored target scene image, and the spectral information as an input or a partial combination of the intensity image, the polarization degree, the polarization phase angle, the restored target scene image, the spectral information as the input and perform noise reduction and feature fusion on the polarization image in combination with a noise reduction module and a convolutional neural network (CNN); the transformer sub-module is a Transformer model configured to extract related data of a target object; and the prediction output sub-module is configured to process data output by the transformer sub-module to obtain the multi-target detection result;

wherein the multi-target detection result comprises object types and positions of objects in the target scene;

wherein the target scene image enhancement module adopts a polarization image enhancement model $IMG(O)=k_1*C1\{I_0, I_{45}, I_{90}, I_{135}\}+k_2*C2\{IMG(D)\}+k_3*C3\{IMG(A)\}$;

wherein the IMG(O) denotes the image information to be restored of the target scene, the $C1\{I_0, I_{45}, I_{90}, I_{135}\}$ denotes a preferred image calculated according to a first polarization image, a second polarization image, a third polarization image, and a fourth polarization image respectively having a linear polarization angle of 0°, 45°, 90°, 135°, the preferred image is a single polarization angle image or a multi-angle calculated image; the IMG(D) denotes a polarization degree image, and the C2 {IMG(D)} denotes a first calculation image containing edge highlight information of a target space obtained through the polarization degree image; the IMG(A) denotes a polarization phase angle image, and the C3 {IMG(A)} denotes a second calculation image containing surface information of a target object obtained through the polarization phase angle image; the k1, the k2, and the k3 respectively denote an intensity coefficient of a calculation preferred image of the polarization image, an intensity coefficient of a polarization degree calculation image of the polarization image, and an intensity coefficient of a polarization phase angle calculation image of the polarization image.

2. The polarization intelligent sensing system according to claim 1, wherein the polarization image processing module comprises a polarization image preprocessing unit and a polarization information calculation unit; the polarization image preprocessing unit is configured to preprocess the polarization image to obtain a preprocessed polarization image, and the polarization information calculation unit is configured to perform calculation on the preprocessed polarization image to obtain polarization degree information and polarization phase angle information of pixels.

3. The polarization intelligent sensing system according to claim 1, wherein the polarization optical lens is a catadioptric polarization lens, and the catadioptric polarization lens comprises a primary lens, a secondary lens, and a transmission polarization compensation lens group located between the primary lens and the secondary lens;

wherein the transmission polarization compensation lens group comprises a first lens, a second lens, a third lens, and a fourth lens sequentially arranged from the secondary lens to the primary lens;

wherein a front surface, facing the secondary lens, of the first lens is a concave surface, a front surface and a rear surface of the second lens are both concave surfaces, a front surface of the third lens is a concave surface, a rear surface of the third lens is a convex surface, and a front surface and a rear surface of the fourth lens are both convex surfaces.

4. A polarization intelligent sensing method, applied to the polarization intelligent sensing system according to claim 1 and executed by the processor, comprising:

a step S1: performing, by the polarization optical lens and the polarization detector, polarization imaging on the target scene to obtain the polarization image;

a step S2: performing the calculation on the polarization image to obtain the polarization information of the target scene;

a step S3: generating the image information to be restored of the target scene according to the polarization information of the target scene, and constructing the multi-dimensional target detection neural network based on the DETR; and a step S4: obtaining the interpretation information of the target scene based on the image information to be restored of the target scene, the spectral information, or the intensity information through the neural networks;

wherein the multi-dimensional target detection neural network comprises the preprocessing sub-module, the transformer model, and the prediction output sub-module; the preprocessing sub-module is configured to take the combination of the intensity image, the polarization degree, the polarization phase angle, the restored target scene image, and the spectral information as the input or the partial combination of the intensity image, the polarization degree, the polarization phase angle, the restored target scene image, the spectral information as the input and perform the noise reduction and the feature fusion on the polarization image in combination with the noise reduction module and the CNN; the transformer sub-module is configured to extract related data of the target object through the Transformer model; and the prediction output sub-module is configured to process the data output by the transformer sub-module through the FNN to obtain the multi-target detection result.

5. The polarization intelligent sensing method according to claim 4, wherein the step S2 comprises:

a step S21: preprocessing the polarization image to obtain a preprocessed polarization image;

a step S22: obtaining Stokes vectors of the target scene from the preprocessed polarization image; and a step S23: calculating to obtain the polarization information of the target scene based on the Stokes vectors;

wherein the polarization information comprises polarization degree information and polarization phase angle information;

a calculation formula of the polarization degree information DoP is as follows:

$$DoP = \frac{\sqrt{Q^2 + U^2 + V^2}}{I};$$

or a calculation formula of linear polarization degree information DoLP is as follows:

$$DoLP = \frac{\sqrt{Q^2 + U^2}}{I};$$

wherein I, the Q, the U, the V respectively denote the Stokers vectors of the target scene; and a calculation formula of the polarization phase angle information AoLP is as follows:

$$AoLP = \frac{-180}{\Pi} \cdot \arctan\left(\frac{U}{Q}\right).$$

6. The polarization intelligent sensing method according to claim 5, wherein in the step S21, defining adjacent four pixels as a super pixel $I=[I_0, I_{45}, I_{90}, I_{135}]$, denoting detection intensity as $I_d$, denoting a real target intensity as $I_t$, calibrating the detection intensity through a polynomial fitting method to perform image denoising on the polarization image;

wherein the polynomial fitting method satisfies following formula:

$$I_t = a_0 + a_1 I_d + a_1 I_d^2 \ldots a_n I_d^n;$$

wherein $a_0 \ldots a_n$ are coefficients of a polynomial.

7. The polarization intelligent sensing method according to claim 4, wherein in the step S3, constructing a polarization image enhancement model $IMG(O)=k_1*C1\{I_0, I_{45}, I_{90}, I_{135}\}+k_2*C2\{IMG(D)\}+k_3*C3\{IMG(A)\}$;

wherein the IMG(O) denotes the image information to be restored of the target scene, the $C1\{I_0, I_{45}, I_{90}, I_{135}\}$ denotes a preferred image calculated according to a first polarization image, a second polarization image, a third polarization image, and a fourth polarization image respectively having a linear polarization angle of 0°, 45°, 90°, 135°, the preferred image is a single polarization angle image or a multi-angle calculated image; the IMG(D) denotes a polarization degree image, and the C2 {IMG(D)} denotes a first calculation image containing edge highlight information of a target space obtained through the polarization degree image; the IMG(A) denotes a polarization phase angle image, and the C3 {IMG(A)} denotes a second calculation image containing surface information of a target object obtained through the polarization phase angle image; the k1, the k2, and the k3 respectively denote an intensity coefficient of a calculation preferred image of the polarization image, an intensity coefficient of a polarization degree calculation image of the polarization image, and an intensity coefficient of a polarization phase angle calculation image of the polarization image.

* * * * *